(12) United States Patent  
Krasnov et al.

(10) Patent No.: US 7,846,579 B2  
(45) Date of Patent: Dec. 7, 2010

(54) THIN FILM BATTERY WITH PROTECTIVE PACKAGING

(76) Inventors: Victor Krasnov, 18701 Hatteras St., #2, Tarzana, CA (US) 91356; Kai-Wei Nieh, 640 Ranchito Rd., Monrovia, CA (US) 91016

( * ) Notice: Subject to any disclaimer, the term of this patent is extended or adjusted under 35 U.S.C. 154(b) by 1565 days.

(21) Appl. No.: 11/090,408

(22) Filed: Mar. 25, 2005

(65) Prior Publication Data

US 2006/0216589 A1 Sep. 28, 2006

(51) Int. Cl.
*H01M 2/02* (2006.01)

(52) U.S. Cl. .................. 429/175; 429/185; 429/135; 429/162; 429/167; 429/169; 429/186

(58) Field of Classification Search ............... 429/175, 429/185, 135, 148, 162, 167, 169, 177, 186, 429/246, 247
See application file for complete search history.

(56) References Cited

U.S. PATENT DOCUMENTS

| | | | |
|---|---|---|---|
| 3,375,135 A | 3/1968 | Moulton et al. |
| 3,414,685 A | 12/1968 | Geib et al. |
| 3,530,007 A | 9/1970 | Golubovic |
| 3,844,841 A | 10/1974 | Baker |
| 3,969,142 A | 7/1976 | Greatbatch et al. |
| 3,993,508 A | 11/1976 | Erlichman |
| 4,119,769 A | 10/1978 | Schneider et al. |
| 4,309,494 A | 1/1982 | Stockel |
| 4,421,835 A | 12/1983 | Manassen et al. |
| 4,459,328 A | 7/1984 | Mizuhara |
| 4,543,441 A | 9/1985 | Kumada et al. |
| 4,565,753 A | 1/1986 | Goebel et al. |
| 4,597,844 A | 7/1986 | Hiraki et al. |
| 4,619,865 A | 10/1986 | Keem et al. |

(Continued)

FOREIGN PATENT DOCUMENTS

EP 0 829 913 A 3/1998

(Continued)

OTHER PUBLICATIONS

Antaya et al. "Preparation and Characterization of LiCoO$_2$ Thin Films by Laser Ablation Deposition", J. Electrochem. Soc., vol. 140, No. 3, Mar. 1993, pp. 575-578.

(Continued)

*Primary Examiner*—Patrick Ryan
*Assistant Examiner*—Ben Lewis
(74) *Attorney, Agent, or Firm*—Ashok K. Janah; Janah & Associates P.C.

(57) ABSTRACT

A battery comprises a substrate comprising an electrolyte between a pair of conductors, at least one conductor having a non-contact surface. A cap is spaced apart from the non-contact surface of the conductor by a gap having a gap distance $d_g$ of from about 1 μm to about 120 μm. The gap allows the conductor to expand into the gap. The gap is further bounded by side faces about a surrounding perimeter that may be sealed with a seal. In one version, the ratio of the surface area of the non-contact surfaces on the conductor to the total surface area of the side faces is greater than about 10:1. A pliable dielectric can also be provided in the gap.

36 Claims, 7 Drawing Sheets

U.S. PATENT DOCUMENTS

| | | |
|---|---|---|
| 4,663,183 A | 5/1987 | Ovshinsky et al. |
| 4,698,256 A | 10/1987 | Giglia et al. |
| 4,714,660 A | 12/1987 | Gates, Jr. |
| 4,725,345 A | 2/1988 | Sakamoto et al. |
| 4,777,090 A | 10/1988 | Ovshinsky et al. |
| 4,871,433 A | 10/1989 | Wagner et al. |
| 4,873,115 A | 10/1989 | Matsumura et al. |
| 4,877,677 A | 10/1989 | Hirochi et al. |
| 4,904,542 A | 2/1990 | Mroczkowski |
| 4,996,079 A | 2/1991 | Itoh |
| 5,019,467 A | 5/1991 | Fujiwara |
| 5,171,413 A | 12/1992 | Arntz et al. |
| 5,197,889 A | 3/1993 | Rizzo et al. |
| 5,240,794 A | 8/1993 | Thackeray et al. |
| 5,249,554 A | 10/1993 | Tamor et al. |
| 5,262,028 A | 11/1993 | Manley |
| 5,330,853 A | 7/1994 | Hofmann et al. |
| 5,338,625 A | 8/1994 | Bates et al. |
| 5,368,939 A | 11/1994 | Kawamura et al. |
| 5,445,906 A | 8/1995 | Hobson et al. |
| 5,490,911 A | 2/1996 | Makowiecki et al. |
| 5,498,490 A | 3/1996 | Brodd |
| 5,503,912 A | 4/1996 | Setoyama et al. |
| 5,511,587 A | 4/1996 | Miye et al. |
| 5,512,147 A | 4/1996 | Bates et al. |
| 5,512,387 A | 4/1996 | Ovshinsky |
| 5,516,340 A | 5/1996 | Takeuchi et al. |
| 5,547,767 A | 8/1996 | Paidassi et al. |
| 5,552,242 A | 9/1996 | Ovshinsky et al. |
| 5,554,456 A | 9/1996 | Ovshinsky et al. |
| 5,561,004 A | 10/1996 | Bates et al. |
| 5,597,660 A | 1/1997 | Bates et al. |
| 5,607,789 A | 3/1997 | Treger et al. |
| 5,612,152 A | 3/1997 | Bates et al. |
| 5,656,364 A | 8/1997 | Rickerby et al. |
| 5,670,252 A | 9/1997 | Makowiecki et al. |
| 5,670,272 A | 9/1997 | Cheu et al. |
| 5,681,666 A | 10/1997 | Treger et al. |
| 5,700,551 A | 12/1997 | Kukino et al. |
| 5,705,293 A | 1/1998 | Hobson |
| 5,705,297 A | 1/1998 | Warren |
| 5,725,909 A | 3/1998 | Shaw et al. |
| 5,786,582 A | 7/1998 | Roustaei et al. |
| 5,824,374 A | 10/1998 | Bradley, Jr. et al. |
| 5,871,865 A | 2/1999 | Barker et al. |
| 5,894,656 A | 4/1999 | Menon et al. |
| 5,961,672 A | 10/1999 | Skotheim et al. |
| 5,985,485 A | 11/1999 | Ovshinsky et al. |
| 6,017,654 A | 1/2000 | Kumta et al. |
| 6,022,640 A | 2/2000 | Takada et al. |
| 6,118,248 A | 9/2000 | Gartstein et al. |
| 6,148,503 A | 11/2000 | Delnick et al. |
| 6,168,884 B1 | 1/2001 | Neudecker et al. |
| 6,197,450 B1 | 3/2001 | Krasnov et al. |
| 6,217,623 B1 | 4/2001 | Reichert et al. |
| 6,218,049 B1 | 4/2001 | Bates et al. |
| 6,242,129 B1 | 6/2001 | Johnson |
| 6,264,709 B1 | 7/2001 | Yoon et al. |
| 6,280,875 B1 | 8/2001 | Kwak et al. |
| 6,287,711 B1 | 9/2001 | Nieh et al. |
| 6,340,880 B1 | 1/2002 | Higashijima et al. |
| 6,379,835 B1 | 4/2002 | Kucherovsky et al. |
| 6,387,039 B1 | 5/2002 | Moses |
| 6,387,563 B1 | 5/2002 | Bates |
| 6,398,824 B1 | 6/2002 | Johnson |
| 6,402,796 B1 | 6/2002 | Johnson |
| 6,411,780 B1 | 6/2002 | Maruyama |
| 6,413,645 B1 | 7/2002 | Graff et al. |
| 6,517,968 B2 | 2/2003 | Johnson |
| 6,558,836 B1 | 5/2003 | Whitacare et al. |
| 6,632,563 B1 | 10/2003 | Krasnov et al. |
| 6,636,017 B2 | 10/2003 | Zink et al. |
| 6,645,658 B2 | 11/2003 | Morozumi |
| 6,658,124 B1 | 12/2003 | Meadows |
| 6,661,197 B2 | 12/2003 | Zink et al. |
| 6,713,987 B2 | 3/2004 | Krasnov et al. |
| 6,863,699 B1 | 3/2005 | Krasnov et al. |
| 6,866,901 B2 | 3/2005 | Burrows et al. |
| 6,921,464 B2 | 7/2005 | Krasnov et al. |
| 7,056,620 B2 | 6/2006 | Krasnov et al. |
| 7,186,479 B2 | 3/2007 | Krasnov et al. |
| 2001/0041294 A1 | 11/2001 | Chu et al. |
| 2002/0004167 A1 | 1/2002 | Jenson et al. |
| 2002/0028384 A1 | 3/2002 | Krasnov et al. |
| 2002/0071989 A1 | 6/2002 | Verma et al. |
| 2002/0110733 A1 | 8/2002 | Johnson |
| 2002/0150823 A1 | 10/2002 | Breitkopf et al. |
| 2003/0121142 A1 | 7/2003 | Kikuchi et al. |
| 2003/0152829 A1 | 8/2003 | Zhang et al. |
| 2003/0160589 A1 | 8/2003 | Krasnov et al. |
| 2004/0018424 A1 | 1/2004 | Zhang et al. |
| 2004/0064937 A1 | 4/2004 | Krasnov et al. |
| 2004/0086762 A1 | 5/2004 | Maeda et al. |
| 2004/0175609 A1* | 9/2004 | Yageta et al. .................. 429/82 |
| 2005/0079418 A1 | 4/2005 | Kelley et al. |
| 2007/0166612 A1 | 7/2007 | Krasnov et al. |
| 2008/0213664 A1 | 9/2008 | Krasnov et al. |
| 2008/0263855 A1 | 10/2008 | Li et al. |
| 2009/0010462 A1 | 1/2009 | Ekchian et al. |
| 2009/0057136 A1 | 3/2009 | Wang et al. |

FOREIGN PATENT DOCUMENTS

| | | |
|---|---|---|
| EP | 1458037 A | 9/2004 |
| FR | 2 403 652 A | 4/1979 |
| GB | 2251119 A | 6/1992 |
| JP | 59-032023 A | 2/1984 |
| JP | 59-226472 A | 12/1984 |
| JP | 59 226472 A | 12/1984 |
| JP | 59226472 A | 12/1984 |
| JP | 60-072168 | 4/1985 |
| JP | 61-195563 A | 8/1986 |
| JP | 09-259929 A | 10/1997 |
| JP | 2001 044073 A | 2/2001 |
| JP | 2001-044073 A | 2/2001 |
| JP | 2003-249199 A | 9/2003 |
| JP | 2003249199 A | 9/2003 |
| WO | WO 95/14311 A | 5/1995 |
| WO | WO-95/14311 A | 5/1995 |
| WO | WO-99/23714 | 5/1999 |
| WO | WO 99/23714 | 5/1999 |
| WO | WO 00 60689 A | 10/2000 |
| WO | WO-01/73873 A | 10/2001 |
| WO | WO 02 21627 A | 3/2002 |
| WO | WO-02/21627 A3 | 3/2002 |
| WO | WO-02/42516 A3 | 5/2002 |
| WO | WO-03/005477 A3 | 1/2003 |
| WO | WO 03/003149 A | 7/2003 |
| WO | WO 03/061049 A1 | 7/2003 |
| WO | WO-03/073531 A3 | 12/2003 |
| WO | WO-2006/105050 A3 | 10/2006 |
| WO | WO-2006/105188 A1 | 10/2006 |
| WO | WO-2008/108999 A3 | 11/2008 |
| WO | WO 2008/134053 | 11/2008 |

OTHER PUBLICATIONS

Fragnaud et al. "Characterization of sprayed and sputter deposited LiCoO2 thin films for rechargeable microbatteries", J. Power Sources, 63 (1996), pp. 187-191.

Birke et al. "Materials for lithium thin-film batteries for application in silicon technology", Solid State Ionics, 93 (1997), pp. 1-15.

Benqlilou-Moudden et al. "Amorphous Lithium Cobalt and Nickel Oxides Thin Films Preparation and Characterization by RBS and PIGE", Thin Solid Films 333 (1998), pp. 16-19.

Jenson, Mark, U.S. Appl. No. 60/191,774, "Comprehensive patent for the fabrication of a high volume, low cost energy products such as solid state lithium ion rechargeable battery, supercapacitors and fuel cells", filed Mar. 24, 2000.

Jenson et al., U.S. Appl. No. 60/225,134, "Apparatus and method for rechargeable batteries and for making and using batteries", Aug. 14, 2000.

Jenson et al., U.S. Appl. No. 60/238,673, "Battery Having Ultrathin Electrolyte", filed Oct. 6, 2000.

Krasnov et al., U.S. Appl. No. 11/946,819, "Thin Film Battery Comprising Stacked Battery Cells and Method", filed Nov. 28, 2007.

Nieh et al., U.S. Appl. No. 12/032,997, "Thin Film Battery Fabrication Using Laser Shaping", filed Feb. 18, 2008.

Bates, J.B. et al.; "Preferred Orientation of Polycrystalline LiCoO2 Films" Journal of the Electrochemical Society, Issue No. 147 (1).

Ron, N-S, et al.; "Effects of Deposition condition on the ionic conductivity . . . " Scriptia Materialia, Dec. 17, 1999, pp. 43-49, vol. 42. No. 1, New York , NY.

Bolster, M-E et al.; "Investigation of lithium intercalation metal oxides . . . " Proceedings of the Int'l Power Source Symposium, Jun. 1980, pp. 136-140 vol. SYMP 34.

Wagner, A.V. et al.; "Fabrication and Testing of thermoelectric thin film devices" 15th Int'l Conf. on Thermoelectronics Mar. 1996 pp. 269-273.

Neudecker et al.; "Lithium-Free Thin-Film Battery . . . " Journal of the electrochemical Society, Issue No. 147 (2) 517-523 (2000).

Mattox, Donald; "Handbook of Physical Vapor Deposition (PVD) . . . ." Surface Preparation adn Contamination Control 1998, pp. 127-135 and 343-364.

Y.J. Park eta l; "Characrterization of tin oxide/LiMn2o4 thin-film cell," Journal of Power Sources, Jun. 200, pp. 250-254, vol. 88, No. 2, Elsevier Science S.A.

PCT International Search Report in Application No. PCT/US2008/013213 (WO 2009/073150 A1), mailed Jun. 18, 2009.

* cited by examiner

THIN FILM BATTERY WITH PROTECTIVE PACKAGING

BACKGROUND

Batteries having thin film components are typically manufactured using processing techniques used to fabricate semiconductors or displays. Their small size allows thin film batteries to be used in many applications, such as for example, portable electronics, medical devices, and space systems. The energy density and specific energy of thin film batteries, which express the energy capacity of the battery per unit volume and weight, respectively, are important performance measures, and consequently, it is desirable to increase the energy density and specific energy of such batteries.

The battery components, such as the anode, cathode and electrolyte, can be sensitive to exposure to the surrounding external environment, for example air, oxygen, carbon monoxide, carbon dioxide, nitrogen, moisture and organic solvents. Thus, protective packaging for the battery cell is provided to reduce or eliminate exposure of the thin films to the external environment. For example, a protective sheet of polymer can be laminated onto the battery structure to serve as protective packaging. However, the resultant laminate structure is often much thicker than the original battery. For example, the laminated sheets typically have to be tens or hundreds of micrometers thick to provide adequate protection and structural support, whereas the battery component themselves are only a few micrometers thick. Thus, the laminated packaging substantially increases the weight and volume of the battery, and consequently, reduces its energy density.

A protective covering film deposited onto the battery structure in the same way as the component films of the battery can also serve as protective packaging. Such protective films can include ceramics, metals and parylene. However, such films often do not provide complete protection for a sufficiently long time and can allow gases or other atmospheric elements to leach through the films in a relatively short time of only a few months. These covering films also do not provide adequate structural support, and their use may entail additional packaging to increase the structural strength of the battery, and thus further reduce its energy density. Furthermore, these films have to also be several tens of micrometers thick to provide adequate environmental protection, and this additional thickness further reduces energy density.

A sheet of glass can also be positioned over the battery component films to serve as protective packaging. However, the glass sheet presents an inflexible boundary to the underlying battery component films. For example, the anode typically expands and contracts during the charge and discharge cycles of the battery. The inflexible glass sheet restricts such expansion creating mechanical stresses in the anode which may eventually lead to mechanical or chemical failure and reduce the lifetime or degrade the performance of the battery. The glass sheet is also typically too thick and weighty, thus further reducing the energy density and specific energy of the battery.

Thus, there is a need for a battery that protects against the environmental elements for the battery component films. There is also a need for a battery having relatively high energy density and specific energy. There is further a need for a battery that provides protection to the comprising components for long periods of time. There is also a need for a battery having adequate structural support.

SUMMARY

A battery comprises a substrate comprising an electrolyte between a pair of conductors. At least one conductor has a non-contact surface. A cap is provided that is spaced apart from the conductor with the non-contact surface by a gap having a gap distance $d_g$ of from about 1 μm to about 120 μm. The spaced apart gap allows the conductor can expand into the gap.

In another version, the battery comprises a first substrate comprising an electrolyte between a first pair of conductors with at least one of the first pair of conductors having a first non-contact surface, and a second substrate comprising an electrolyte between a second pair of conductors with at least one of the second pair of conductors having a second non-contact surface. A first gap is provided about the first non-contact surface of the first pair of conductors and a second gap is provided about the second non-contact surface of the second pair of conductors. The first and second gaps each comprise a gap distance $d_g$ of from about 1 μm to about 120 μm, whereby the first and second gaps allow the first and second conductors to expand into the gaps.

In a further version, a battery with first and second substrates also has a pliable dielectric abutting at least one of the first or second non-contact surfaces, the pliable dielectric having a thickness sufficiently thick to prevent generated electrical currents from passing therethrough and sufficiently thin to block diffusion of external gases from the peripheral edge of the pliable dielectric to the first and second pairs of conductors.

In yet another version, a battery comprises a substrate having (i) a first surface comprising a first battery cell comprising a first electrolyte between a first pair of conductors, at least one of the first pair of conductors having a first non-contact surface, and (ii) a second surface comprising a second electrolyte between a second pair of conductors, at least one of the second pair of conductors having a second non-contact surface. A first cap is spaced apart from the first non-contact surface of a conductor by a first gap having a gap distance $d_{g1}$ of from about 1 μm to about 120 μm, whereby the conductor can expand into the first gap. A second cap is spaced apart from the second non-contact surface of a conductor by a second gap having a gap distance $d_{g2}$ of from about 1 μm to about 120 μm, whereby the conductor can expand into the second gap.

In a further version, a battery comprises a substrate having a surface with a plurality of interconnected battery cells on the substrate surface. Each battery cell comprises an electrolyte having opposing surfaces, and first and second conductors contacting the opposing surfaces of the electrolyte, at least one conductor having a non-contact surface. At least one electrical connector strip connects the battery cells. The electrical connector strip has a foot that extends underneath a first conductor of a battery cell and a head that extends over a second conductor of an adjacent battery cell to electrically couple the battery cells to one another.

DRAWINGS

These features, aspects and advantages of the present invention will become better understood with regard to the following description, appended claims, and accompanying drawings, which illustrate examples of the invention. However, it is to be understood that each of the features can be used in the invention in general, not merely in the context of the particular drawings, and the invention includes any combination of these features, where:

DESCRIPTION

Figure 1:
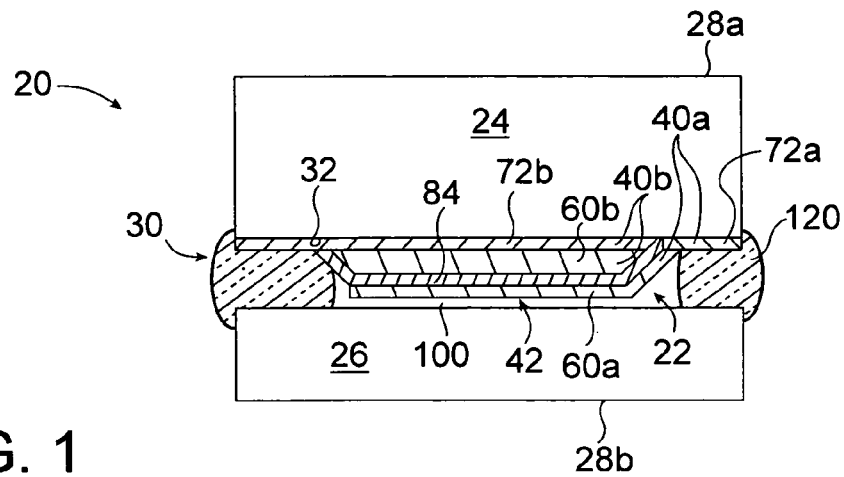
FIG. 1 is a sectional view of a battery comprising a single battery cell on a substrate with a gap between the battery cell and a facing cap.

An embodiment of a battery 20 having features of the present invention is illustrated in FIG. 1. The battery 20 is useful in many applications requiring small size, high specific energy and energy density, and resistance to environmental elements. In the version shown, the battery 20 comprises a single battery cell 22 enclosed on one side by the substrate 24 and on the other side by a cap 26 facing the substrate 24. The enclosure formed by the substrate 24 and cap 26 protects the thin films of the battery cell from the external environment. The substrate 24 is made from a material that is suitably impermeable to environmental elements, has a relatively smooth surface 32 upon which to form thin films, and also has sufficient mechanical strength to support the deposited thin films at fabrication temperatures and at battery operational temperatures. The substrates 24 may be an insulator, semiconductor, or a conductor, depending upon the desired electrical properties of the exterior substrate surface 28a. For example, the substrate 24 can also be made from aluminum oxide or glass, or even aluminum or steel, depending on the application.

In one version, the substrate 24 comprises mica, which is a layered silicate typically having a muscovite structure, and a stoichiometry of $KAl_3Si_3O_{10}(OH)_2$. Mica has a six-sided planar monoclinical crystalline structure with good cleavage properties along the direction of the large planar surfaces. Because of this crystal structure, mica may be split into thin foils along its cleavage direction to provide thin substrates 24 having surfaces which are smoother than most chemically or mechanically polished surfaces. Chemically, mica is stable and inert to the action of most acids, water, alkalies, and common solvents, making it a good surface covering for the battery. Electrically, mica has good dielectric strength, a uniform dielectric constant, and low electrical power loss factor. Mica is also stable at high temperatures of up to 600° C. and has good tensile strength. A mica substrate 24 having a thickness of less than about 100 μm, and more typically from about 4 μm to about 25 μm, is sufficiently strong to provide a good mechanical support for the battery 20. This substrate thickness also provides a good barrier to external gases and liquids in the direction normal to the cleavage plane of the planar strata and is thus capable of providing good environmental protection in many different environments. Mica also has a relatively low weight and volume, thus improving the specific energy and energy density of the battery.

At the other side of the battery cell 22, facing the substrate 24 is a cap 26 that serves as a portion of the battery enclosure. The cap 26 is typically made from a material that is resistant to environmental degradation and provides an impenetrable seal from external gases and liquids. The cap 26 can also comprise the same material as the substrate 24, such as a sheet of mica, in which case both wide area sides of the battery are enclosed by mica sheets. The substrate 24 or cap 26 can also be made from other materials, including quartz, metal foil, metalized plastic film, metal casing, ceramic casing or glass casing. In one example, the entire enclosure is made from a cap 26 comprising a metal foil that is joined together at its edges by solder or glue, as for example shown in FIG. 7. The substrate 24 and cap 26 can also be made from different materials, for example, a substrate 24 of mica and a cap 26 of metal foil.

The substrate 24 and facing cap 26 form a large percentage of the external enclosing surface area of the battery 20 that protects the internal battery structure from exposure and corrosion by the surrounding environment. For example, in one type of battery, the exterior surface 28a of the substrate 24 itself forms approximately 45% of the total external area of the battery 20, and another 45% of the total external area is formed by the exterior surface 28b of the cap 26. The remaining 10% or less of external area of the battery 20 occurs along a plurality of side faces 30 that are the spaces between the cap 26 and substrate 24. Preferably, the battery 20 is fabricated so that at least one substrate 24, on which a battery cell 22 is formed, serves to also form a large percentage of the area of the battery 20 that is exposed to the surrounding environment. Thus, in the battery shown in FIG. 1, about 45% of the external surface area of the battery 20 is formed by the exterior surface 28a of the substrate 24, and the exterior surface 28b of the cap 26 forms about another 45%, with the remaining 10% is formed by the side faces 30. In the alternative, when the substrate 24 and cap 26 are made from the same material, for example, two sheets of mica—about 90% of the external surface area of the battery 20 arises from the surfaces 28a,b. By using the substrate 24 itself, to serve as the supportive structure for the battery 20 as well as the enclosing environment, the weight and volume of the enclosing structure is minimized, thereby increasing the energy density of the battery.

Each battery cell 22 of the battery 20 comprises a plurality of conductors 40a,b that are on opposing surfaces of an electrolyte 84. The conductors 40a,b are made from conducting metals and can serve as electrodes 60a,b, current collectors 72a,b, adhesion film, or combinations thereof. For example, the first pair of conductors 40a can include an anode electrode 60a, and optionally, can also include an anode current collector 72a. In some versions, an anode current collector 72a is not used because the anode 60a serves both as the anode current collector and the anode itself. The second pair of conductors 40b can include a cathode electrode 60b and an optional cathode current collector 72b. The position and order of the conductors 40a,b may be interchanged, for example, the position of the anode 60a and anode current collector 72a may be interchanged with the position of the cathode 60b and cathode current collector 72b. Thus, the claims should not be limited to the illustrative version shown in the drawings. In the version shown in FIG. 1, when used, the anode current collector 72a and the cathode current collector 72b are both formed on the surface of the substrate 24 and the other layers are deposited over these layers.

The electrodes, namely the anode 60a and cathode 60b, each comprise an electrochemically active material, such as, for example, amorphous vanadium pentoxide $V_2O_5$, or one of several crystalline compounds such as $TiS_2$, $LiMnO_2$, $LiMn_2O_2$, $LiMn_2O_4$, $LiCoO_2$ and $LiNiO_2$. The electrodes 60a,b typically have a thickness that is sufficiently thick to provide good current carrying capacity and sufficiently thin to minimize expansion stresses and electrical resistance for the passage of both ions and electrons. A suitable thickness for the electrodes 60a,b is from about 0.1 μm to about 20 μm. In one version, electrodes 60a,b are made from a lithium film which is sufficiently conductive to also serve as the current collectors 72a,b, and in this version the electrodes 60a,b and the current collectors 72a,b are the same. In yet another version, one or more of the electrodes 60a,b may be made from metals; as one example, the anode 60a may be made from a metal such as copper.

The current collectors 72a,b provide a conducting surface from which electrons may be dissipated or collected from the electrodes 60a,b. The current collectors 72a,b are thus shaped and sized to increase electron conductivity to or from the electrodes 60a,b and are formed over or below the electrodes to electrically couple to them. The current collectors 72a,b are typically conductive layers comprising metal-containing materials, such as for example, metal, non-reactive metal, metal alloy, metal silicide, or mixtures thereof. For example, in one version, each current collector 72a,b comprises a non-reactive metal such as silver, gold, platinum or aluminum. The advantage to using a non-reactive metal is that the battery 20 may be processed at relatively high temperatures after forming the current collectors 72a,b without the current collector material reacting with other component films of the battery 20. However, in other versions, the current collectors 72a,b need not be a non-reactive metal. The current collectors 72a,b have a thickness selected to provide a suitable electrical conductivity; for example, in one version, the current collectors 72a,b have thicknesses of from about 0.05 μm to about 5 μm.

The battery 20 may also comprise one or more adhesion layers (not shown) deposited on the substrate 24 or other layers to improve adhesion of overlying layers. The adhesion layer can comprise a metal such as, for example, titanium, cobalt, aluminum, other metals; or a ceramic material such as, for example, $LiCoO_x$, which may comprise a stoichiometry of $LiCoO_2$. In one version, the adhesion layer is deposited on the substrate 24 and comprise the same material as the current collectors 72a,b.

The battery 20 also comprises an electrolyte 84 between the pair of conductors 40a,b such as the anode 60a and the cathode 60b. The electrolyte 84 may be, for example, an amorphous lithium phosphorus oxynitride film, also known as a LiPON film. In one embodiment, the LiPON is of the form $Li_xPO_yN_z$ in an x:y:z ratio of about 2.9:3.3:0.46. In one version, the electrolyte 84 has a thickness of from about 0.1 μm to about 5 μm. This thickness is suitably large to provide sufficiently high ionic conductivity and suitably small to reduce ionic pathways to minimize electrical resistance and reduce stress.

The battery 20 has a single separation gap 100 between a non-contact surface 42 of a conductor 40a, such as a surface of an electrode 60a, formed on the substrate 24 and the cap 26. The separation gap 100 can either be a space between the conductor 40a and the cap 26. The separation gap 100 provides room for the components of the battery cell 22 to expand and move during operation of the battery 20. For example, the battery cell 22 may generate or receive heat during operation which may cause the conductors 40a,b, for example, the electrodes 60a,b, optional current collectors 72a,b or other components of the battery cell 22, to undergo thermal expansion. The electrodes 60a,b or the electrolyte 84, or both, may also experience expansion or contraction of their volume due to the removal or addition of material to these layers through electrochemical processes occurring during operation of the battery 20. Without the separation gap 100, components of the battery 20 would have no room to expand and may experience undesirable mechanical stresses, which could lead to reduced performance or failure of the battery 20. For example, undesirable mechanical stresses may result in a physical failure, such as a breakage or delamination, of a comprising battery cell film. This may cause a discontinuity in an electrical path of the battery 20 or a parasitic electrical resistance that may reduce performance of the battery 20, such as reducing the output voltage, power storage capacity, or charging time.

The separation gap 100 has a gap distance $d_g$ that is selected to be sufficiently large to provide room for expansion of battery components. The gap distance $d_g$ is selected to be sufficiently small to avoid excessively impacting the energy density of the battery 20. For example, in one version, the gap distance $d_g$ is selected to be from about 1 μm to about 120 μm. In another version, the gap distance $d_g$ is selected to be less than about 10 μm. The gap 100 is bounded by the non-contact surface 42, which is on at least one of the conductors 40a,b and the side faces 30 which are the originally open side facing regions around the perimeter edge of the gap 100 not enclosed by the substrate 24 or cap 26. The total area of the side faces 30 is maintained small by maintaining a small gap distance $d_g$ to reduce the diffusion or passage of gas species that enter the battery 20 from the side faces 30 and travel to the conductor 40 or other films of the battery and cause corrosion or other degradation of the thin films. Thus, preferably, the ratio of the area of the non-contact surface 42 of the conductor 40a to the total area of the side faces 30 is at least about 10:1 and more preferably, from about 20:1 to about 50:1. The total area of the side faces 30 is the cumulative area of the side faces 30. The separation gap 100 presents a location where the components of the battery cell 22 might be exposed to undesirable atmospheric elements if otherwise unprotected. A narrow gap 100 defines a narrow passage that limits migration of gas or other contaminant species from the external environment to the conductors 40a,b.

To further reduce or entirely prevent migration of gas species from the side faces 30 to the conductors 40a,b and other thin films, a seal 120 extends around the side faces 30 of the gap 100. The seal 120, in conjunction with the substrate 24, provides a hermetic boundary between the battery components and environmental elements. For example, the seal 120 is environmentally stable and provides a barrier against moisture. Preferably, the seal 120 comprises a moisture permeability of less than about 10 g/(mil*inch$^2$)/day. The seal 120 can also be pliant to allow lateral expansion of the conductors 40a,b by being made form a pliable dielectric or conducting material. For example, the seal 120 can be made from epoxy, polymerized ethylene acid copolymer, Apiezon® (M&I Materials LTC, U.K.), paraffin, wax, Surlyn® (Dupont de Nemours), or mixtures thereof. The seal 120 may also comprise a conductive material such as metal or ceramic powder filled epoxy and low melting point metal such as indium, tin, lead, or mixtures thereof. When conductive materials are used as seals, they need to be insulated from the current collectors 72a,b.

Figure 2:
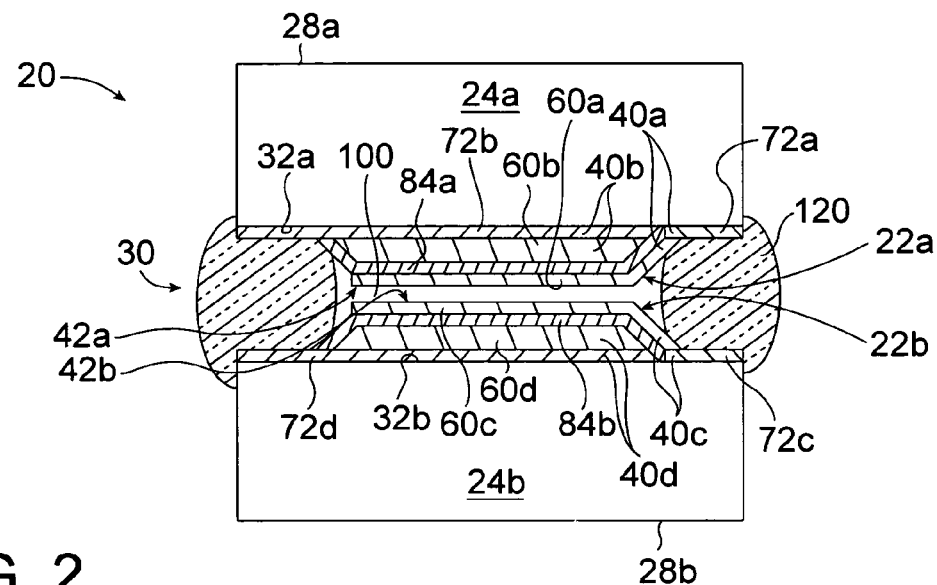
FIG. 2 is a sectional view of a battery comprising two facing battery cells with a gap therebetween and enclosed by caps which are the substrates themselves.

In the version illustrated in FIG. 2, the battery 20 comprises two battery cells 22a,b that face one another with a separation gap 100 therebetween. The first battery cell 22a comprises a first pair of conductors 40a, 40b on a first substrate 24a; and the second battery cell 22b comprises a second pair of conductors 40c, 40d on a second substrate 24b. In this version, each conductor 40a-d comprises an electrode 60a-d and a current collector 72a-d. For example, in cell 22a, the pair of conductors 40a, 40b comprises an anode 60a and cathode 60b, respectively, and also includes two current collectors comprising an anode current collector 72a and a cathode current collector 72b, respectively. Similarly, in cell 22b, the pair of conductors 40c, 40d comprises an anode 60c and cathode 60d, respectively, and also includes two current collectors comprising an anode current collector 72c and a cathode current collector 72d, respectively. The position and order of the conductors 40a-d may be interchanged, for example, the position of the anodes 60a,c and anode current collectors 72a,c may be interchanged with the position of the cathode 60b,d and cathode current collector 72b,d. In the version shown in FIG. 2, both current collectors 72a,b are formed on the substrate 24a. The separation gap 100 between the battery cells 22a,b also prevents cross-talk between electrically independent conductors, such as the electrodes 60a,d from opposing battery cells 22a,b which face each other across the gap 100.

Figure 3:
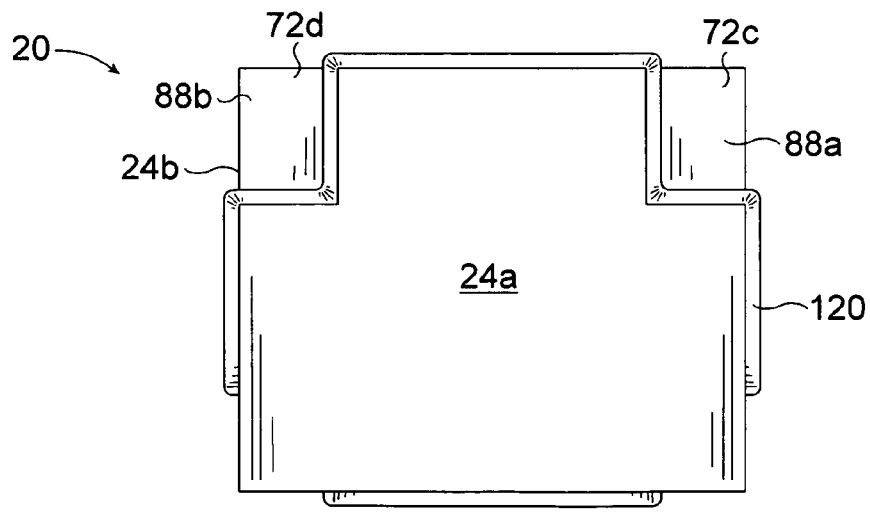
FIG. 3 is a top view of the battery of FIG. 2.

The battery 20 comprises a set of battery terminals 88a,b to the exterior surface of the battery 20, as shown in FIG. 3. The terminals 88 comprise a negative terminal 88a and a positive terminal 88b. The battery 20 can also comprise multiple sets of terminals that include a first set of positive and negative terminals, and a second set of positive and negative terminals. The terminals 88a,b can be exposed portions of the current collectors 72c,d, respectively, as for example, shown in FIG. 3, where a portion of each current collector 72c,d extends out from the interior of the battery 20 to present a surface to the exterior environment that acts as the terminals 88a,b. Each terminal 88a,b that is an exposed surface of a current collector 72c,d is an electrical thin film conductor substantially free of defects, and can be made of the same material as the current collectors 72. In another version, the terminal 88 is a metal foil or wire that is attached to the current collector 72.

In the version of FIG. 2, the battery 20 comprises a single separation gap 100 between a non-contact surface 42a of the first pair of conductors 40a, 40b and a non-contact surface 42b of the second pair of conductors 40c, 40d, with at least one of the first pair of conductors 40a, 40b spaced apart from at least one of the second pair of conductors 40c, 40d by the gap distance $d_g$. In this version, the battery 20 comprises two complete battery cells 22a,b, each battery cell 22a,b producing a battery cell voltage across an independent set of terminals (not shown). The two battery cells 22a,b can be electrically independent with separate terminals or can be connected in series or in parallel. In this version, the separation gap 100 is between a conductor 40 and the second substrate 24b, which serves as a cap 26. The cap 26 can also be a material that is impermeable to aforementioned environmental elements, such as for example, glass. The separation gap 100 can either be a space between the conductor 40 and the cap 26 or the gap 100 can be filled with a pliable material as described below. The gap 100 can also have electrical connectors that extend thorough the gap 100 to connect one or more of the conductors 40 on the substrate 24 to the external environment, as described below.

Figure 4:
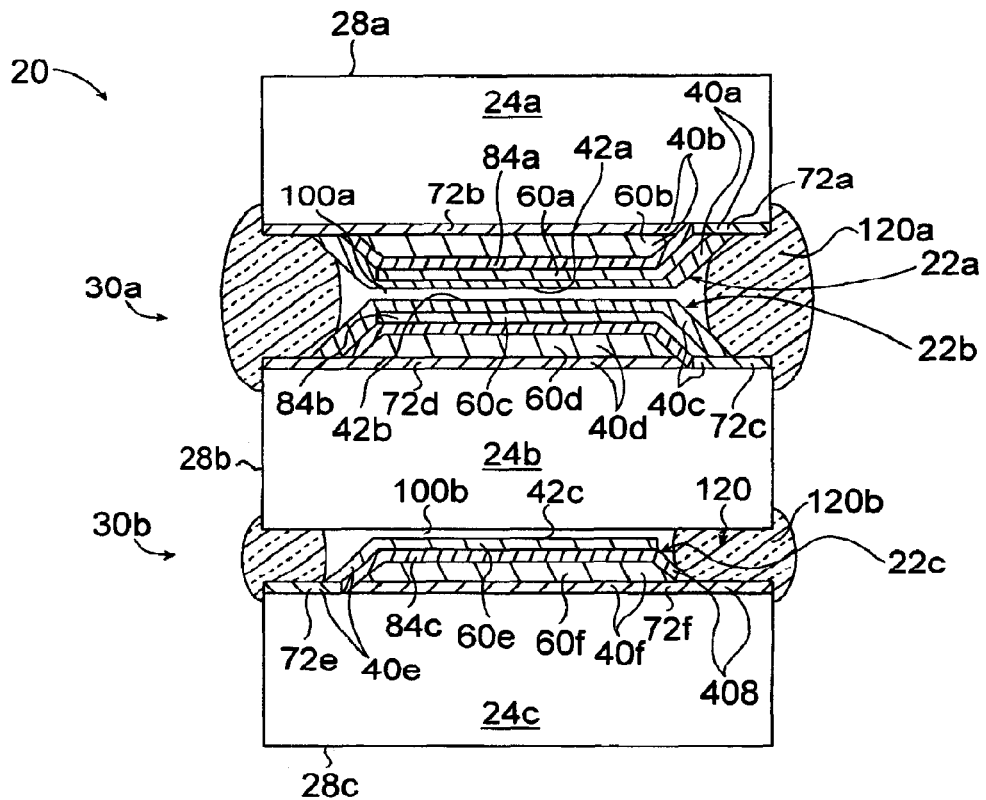
FIG. 4 is a sectional view of a battery comprising two facing battery cell on adjacent and separate substrates and a third battery cell on a substrate which also serves as a cap.

In yet another version, the battery 20 comprises a plurality of battery cells 22 with a plurality of separation gaps 100 between the cells. For example, in one version, such as the version shown in FIG. 4, the battery 20 comprises three battery cells 22a-c with two separation gaps 100a,b having gap distances $d_g$ and $d_{g2}$. In this version, the battery 20 comprises three battery cells 22a-c, each cell 22 electrically independent from the others and presenting an independent pair of terminals (not shown) to the exterior of the battery. The first separation gap 100a having a gap distance $d_g$ is located between a non-contact surface 42a of one of the first pair of conductors 40a, 40b and a non-contact surface 42b of one of the second pair of conductors 40c, 40d. The second separation gap 100b having a gap distance $d_{g2}$ is located between the second substrate 24b and one of a third pair of conductors 40e, 40f formed on a third substrate 24c. Each substrate 24a-c has only one surface with the battery cells 22a-c on it. In this battery 20, the battery cells 22a-c are connected such that the substrates 24a-c themselves form the battery caps, thereby efficiently using the battery cell components to provide a battery with a higher specific energy.

Figure 5:
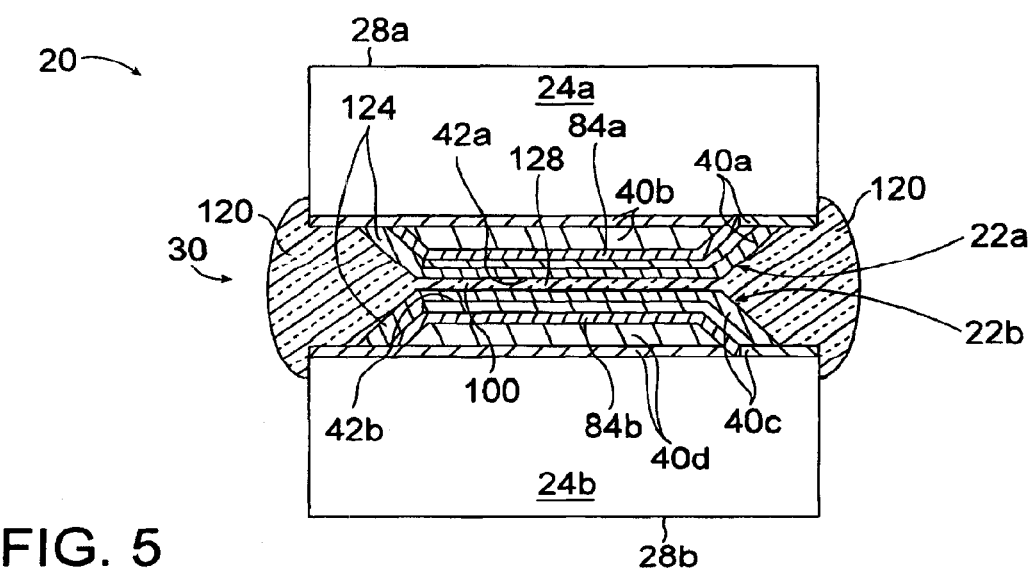
FIG. 5 is a sectional view a battery having facing batteries with a pliable dielectric therebetween and caps formed by the substrates themselves.

In the version of FIG. 5, the separation gap 100 is formed between the non-contact surfaces 42a,b of two facing battery cells 22a,b and is filled by a pliable dielectric 128. The pliable dielectric 128 has enough flexibility to allow expansion of film components of the facing battery cells 22a,b into the filled gap 100. The pliable dielectric 128 also electrically insulates the component films of the battery cells 22a,b and allows the conductors 40a-d about the electrolytes 84a,b to change volume during charge and discharge cycles. Thus, the pliable dielectric 128 comprises a material that does not react with the conductors 40a-d and can withstand pressures applied to the battery 20 during conventional use, without excessive deformation. For example, preferably, the pliable dielectric 128 is capable of withstanding a pressure of up to about 1 kg/mm² with a thickness deformation of less than about 0.1 mm. The pliable dielectric 128 should also be flexible under an applied pressure. In terms of insulative properties, the pliable dielectric 128 can have a resistivity greater than $10^4$ Ωcm. The presence of the pliable dielectric 128 may reduce the minimum gap distance required to prevent electrical communication between conductors 40 in separate battery cells 22. The pliable dielectric 128 may comprise grease (Apiezon®) wax, paraffin, mineral oil or any material that does not react with the conductor, or mixtures thereof. The advantage of using grease is its lower viscosity results in a smaller gap. The pliable dielectric 128 may also comprise other materials. Generally, the pliable dielectric 128 should have a thickness sufficiently thick to prevent generated electrical currents from passing therethrough and sufficiently thin to block diffusion of external gases from the peripheral edge of the pliable dielectric 128 to the thin films of the battery cells 22 within the battery 20. A suitable thickness of the pliable dielectric 128 is from about 1 μm to about 20 μm. The pliable dielectric 128 may be both the dielectric in the separation gap 100 and the seal 120 about the perimeter formed by the side faces 30 of the separation gap 100.

The battery 20 may also comprise a protective layer 124 about some of the components of the battery 20, as shown in FIG. 5. For example, the protective layer 124 can be positioned between the conductors 40 and the separation gap 100 or between the conductors 40a-d and the substrates 24a,b. The protective layer is also pliant and allows the electrodes 60 to change volume during charge/discharge. The protective layer 124 provides further protection to the battery cell component films from atmospheric elements, such as, for example, during manufacture of the battery 20. The protective layer 124 also presents a hermetic boundary between the protected components and the environmental elements. The protective layer 124 may need to protect for a relatively short period of time, for example, only during certain steps of the manufacturing process. Thus, the comprising material of the protective layer 124 need not provide the same degree of protection as the seal 120 and the substrates 24. The protective layer 124 may comprise parylene, dielectric material, or mixtures thereof. The protective layer 124 may also comprise other materials. However, the protective layer 124 does not need to be included only in this particular embodiment, and can be found in any embodiment of the battery 20.

Figure 6:
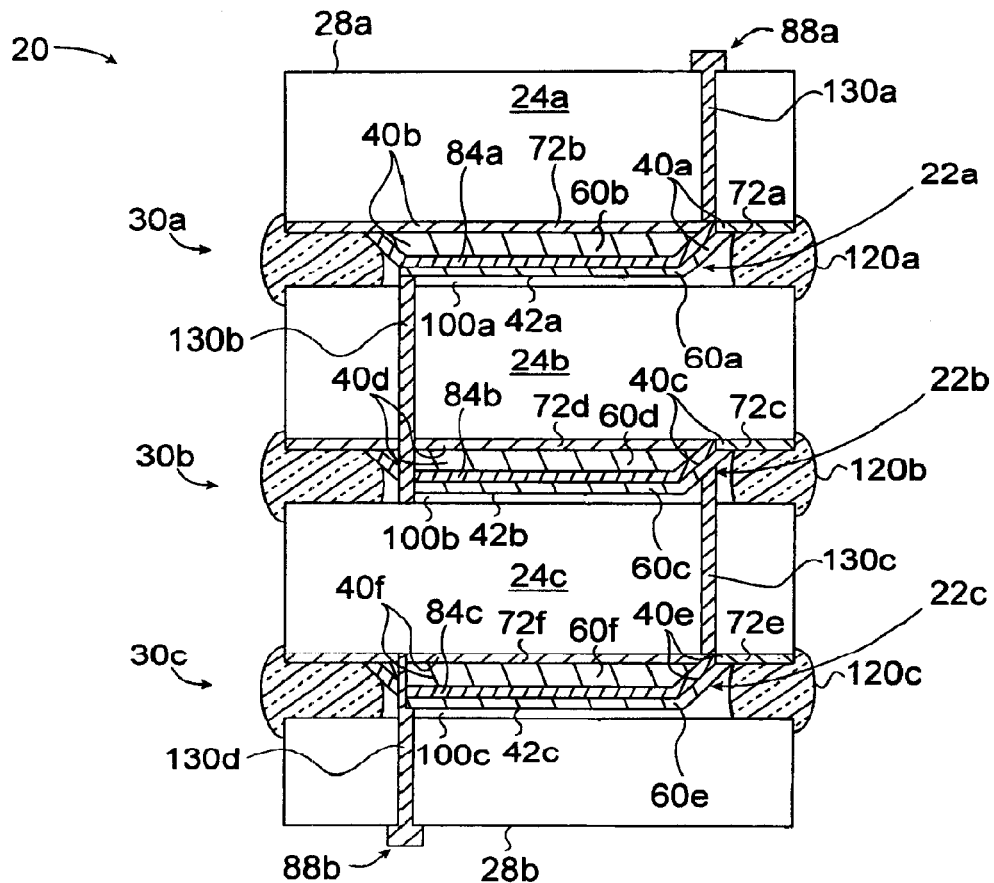
FIG. 6 is a schematic sectional view of a battery comprising a stack of battery cells connected in series.
Figure 7:
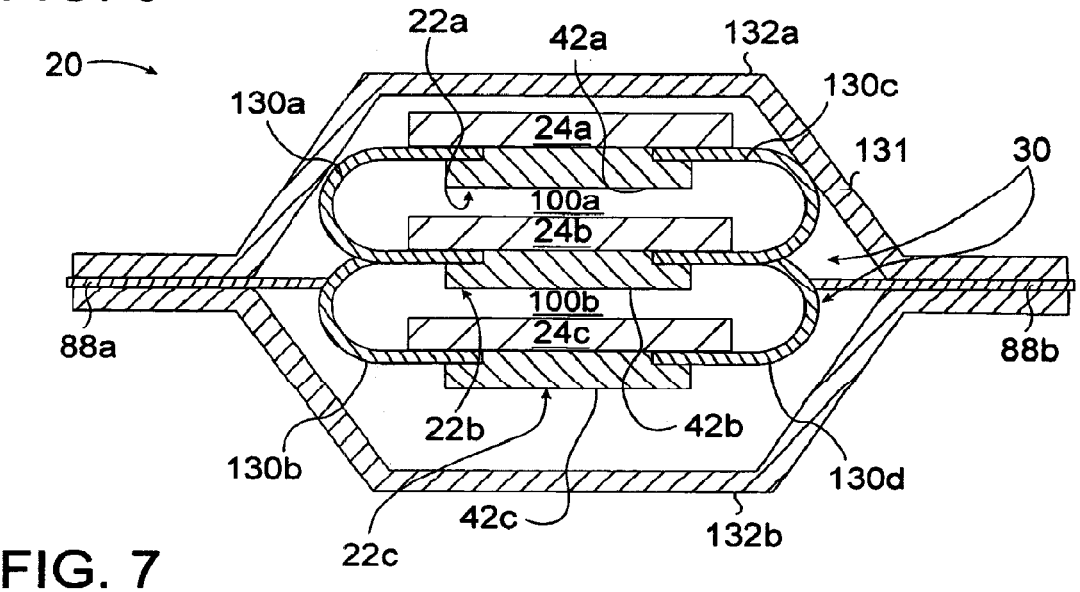
FIG. 7 is a schematic sectional view of a battery comprising a stack of batteries connected in parallel.

Still further versions of the battery 20 comprising a plurality of interconnected battery cells 22a-c are shown in FIGS. 6 and 7. FIG. 6 shows a battery 20 comprising a first battery cell 22a having a first pair of conductors 40a, 40b on a first substrate 24a, a second battery cell 22b having and a second pair of conductors 40c, 40d on a second substrate 24b, and a third battery cell 22c having a third pair of conductors 40e, 40f on a third substrate 24c. Each of the conductors 40a-f comprises an electrode 60a-f and a current collector 72a-f. The electrodes comprise an anode 60a,c,e and a cathode 60b,d,f, and the two current collectors comprising an anode current collector 72a,c,e and a cathode current collector 72b,d,f. The position and order of the conductors 40a-f may be interchanged, for example, the position of the anode 60a,c,e and anode current collector 72a,c,e may be interchanged with the position of the cathode 60b,d,f and cathode current collector 72b,d,f. The battery cells 22a-c are connected in series with the electrical connectors 130a-d which terminate in two terminals 88a,b. The electrical connectors 130a-d can pass through holes in the substrates 24a-c as shown. This version is useful for protecting the current collector and electrical connectors from the environment and to obtain higher voltage.

FIG. 7 also shows three battery cells 22a-c connected in parallel with electrical connectors 130a-d which extend around the cells 22a-c and terminate in two terminals 88a,b. In this battery 20, the battery cells 22a-c are enclosed by a housing 131 comprising two pieces of metal foil 132a,b that wrap around the battery cells 22a-c and are joined with adhesive or solder at their center. The joined electrical connectors 130a-d pass through the housing 131 to form the terminals 88a,b. The housing 131 can serve as shield to prevent electrical or magnetic field from disturbing operation of the battery 20. The housing 131 can also be formed from metalized plastic films, polymer layers, ceramic layers, or metal sheeting. This version is useful in adverse or hostile environments, or where it is desirable for the battery 20 to have improved mechanical strength and to obtain more current and capacity.

Figure 8:
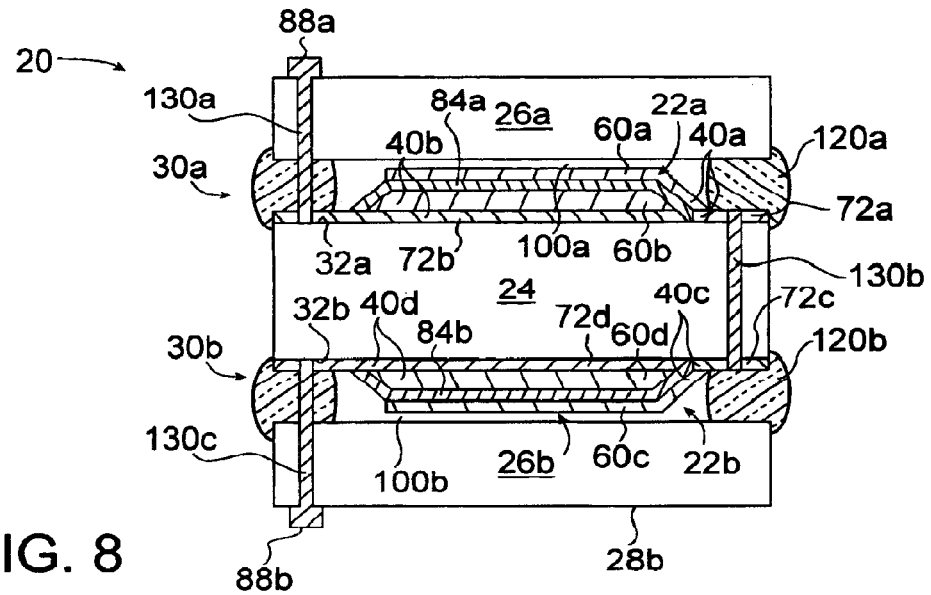
FIG. 8 is a sectional view of a battery comprising battery cells on two opposing surfaces of a single substrate with two caps.

In another version, as shown in FIG. 8, the battery 20 comprises dual battery cells 22a,b which are formed on opposing surfaces 32a,b of a single substrate 24. For example, a first battery cell 22a is formed on a first surface 32a of the substrate 24, and a second battery cell 22b is formed on a second surface 32b of the substrate 24. Each battery cell 22a,b comprises an electrolyte 84a,b between a pair of conductors 40a,b and 40c,d respectively. At least one of each pair of conductors 40a-d has a non-contact surface 42a,b on either side of the substrate 24 that faces a cap 26a,b, and is further surrounded along its edges by seals 120a,b that enclose the side faces 30a,b. The housing enclosure formed by the caps 26a,b and the side seals 120a,b protects the thin films of the battery 20 from the surrounding ambient environment. Such a battery 20 provides an energy density of more than 700 Watt hr/l and a specific energy of more than 250 Watt hr/kg which is twice as much as a conventional battery that is formed only on a single surface. The battery 20 comprises a first separation gap 100a ($d_{g1}$) between the non-contact surface 42a of a conductor 40a on the substrate 24 and the cap 26a, and a second separation gap 100b ($d_{g2}$) between the non-contact surface 42b of a conductor 40b and the cap 26b. Each separation gap 100a,b has a gap distance $d_{g1,2}$ that is sufficiently large to provide room for expansion of battery components. In one version, the gap distance $d_{g1,2}$ is selected to be from about 1 μm to about 120 μm, and more preferably less than 10 μm. In this battery 20, the battery cells 22a,b are connected in series with the electrical connectors 130a-c, which terminate at the terminals 88a,b.

Figure 9:
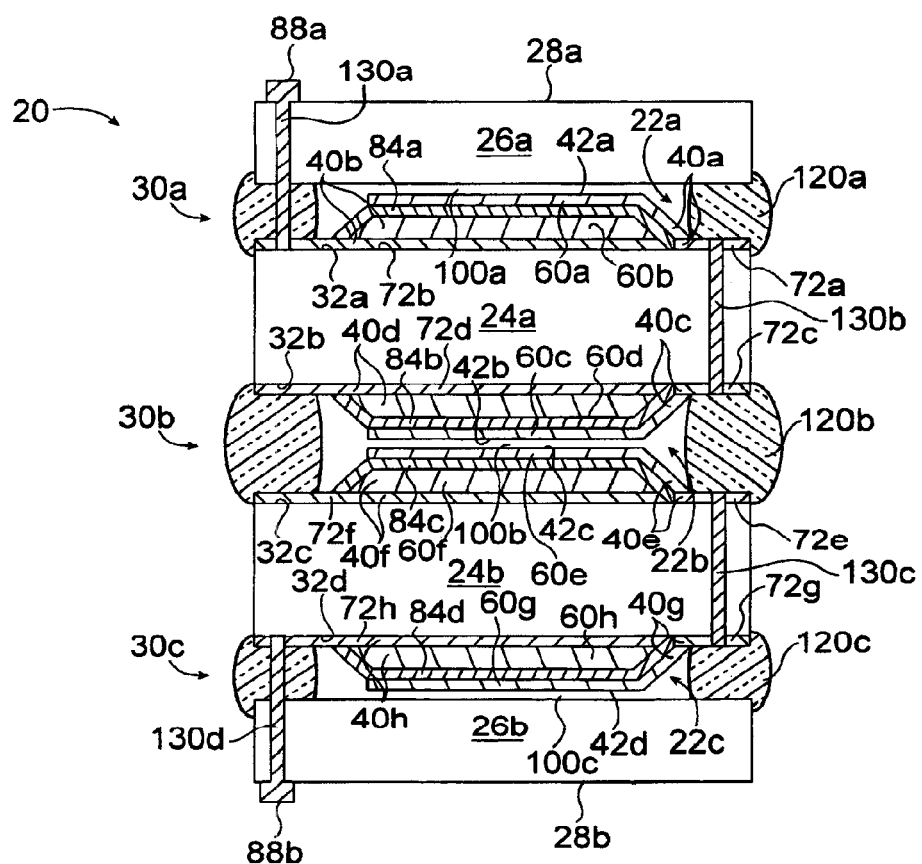
FIG. 9 is a schematic sectional view of a battery comprising an exemplary arrangement of a stack of double sided battery cells connected in series.
Figure 10:
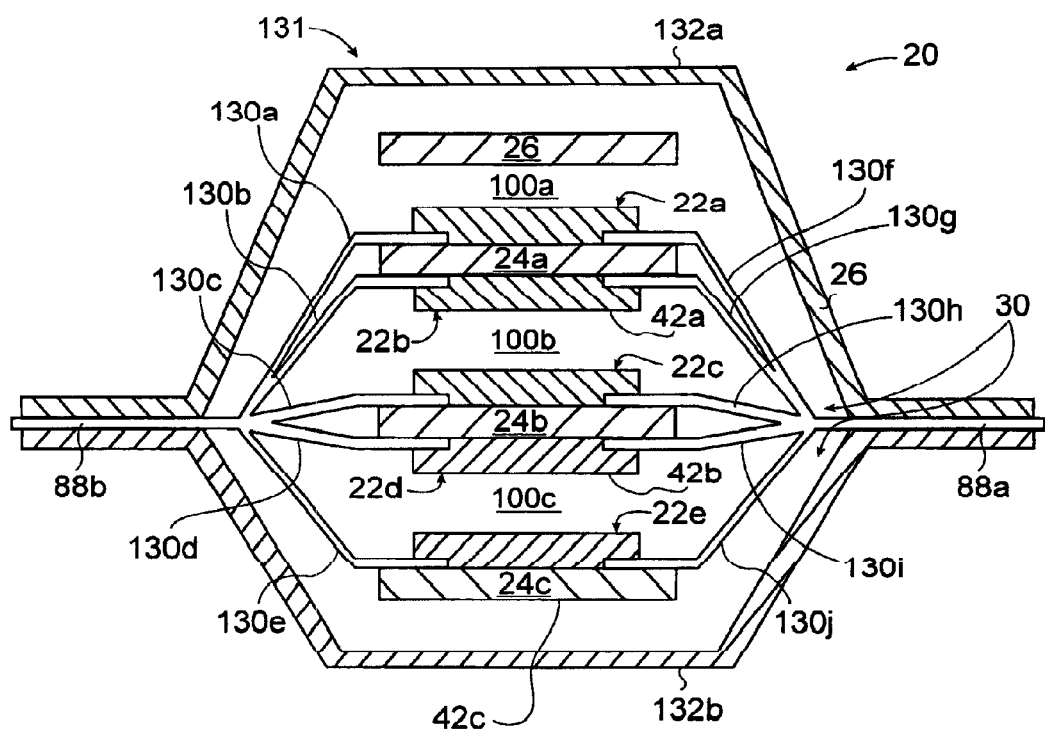
FIG. 10 is a schematic sectional view of a battery comprising an exemplary arrangement of a stack of double sided battery cells connected in a parallel.

FIG. 9 shows a serial arrangement of a battery 20 comprising a stack of substrates 24a,b that each have dual battery cells 22a,b as shown in FIG. 8. The cells are connected in series with electrical connectors 130a-d which extend through and/or around the cells 22a-c to terminate in two terminals 88a,b. FIG. 10 shows another version of a battery 20 comprising substrates 24a-c with multiple battery cells 22a-e that are interconnected in a parallel arrangement, which also have electrical connectors 130a-j extending around the cells 22a-e to terminate in the terminals 88a,b. The housing 131 in each of these arrangements can also be formed from metalized plastic films, polymer layers, ceramic layers or metal sheeting. These versions provide high specific energy levels and can be used in adverse environments.

Figure 11A:
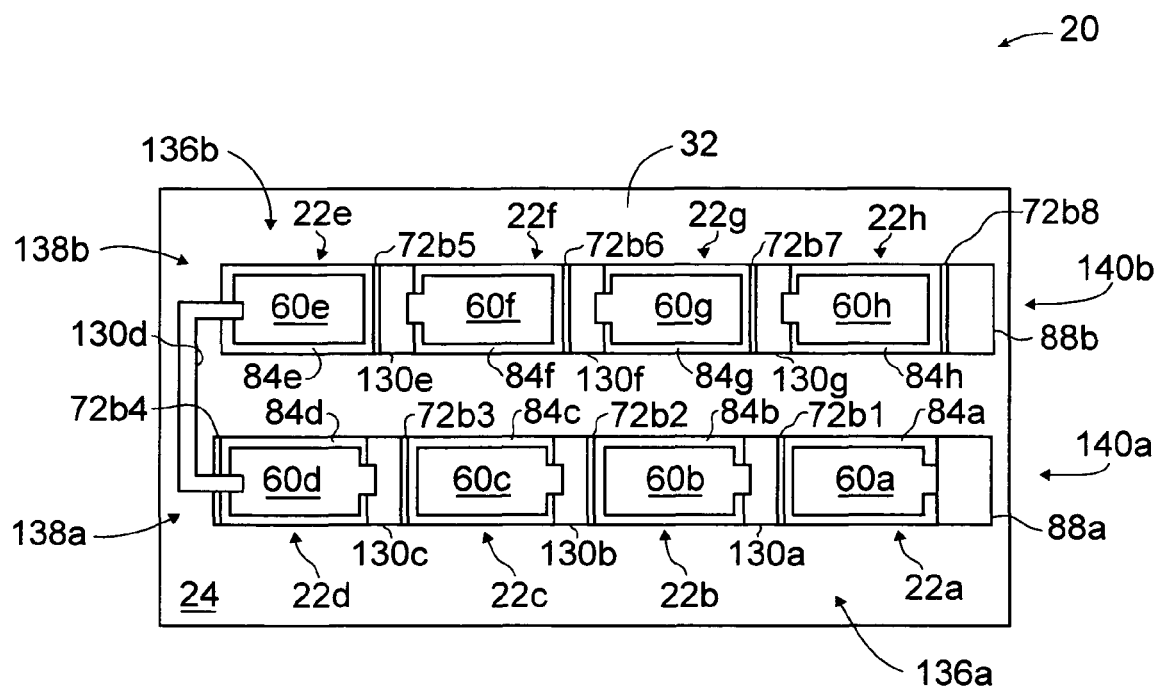
FIG. 11A is a schematic top view of a battery comprising an arrangement of battery cells formed on a single side of a substrate and connected in series.

An embodiment of a battery 20 comprising an arrangement of battery cells 22a-h formed on a single surface 32 of a substrate 24 that is a rectangular sheet of mica is illustrated in FIG. 11A. The battery cells 22a-h can be interconnected with one another in a series or parallel arrangement. For example, a first battery cell 22a is connected in series to a second battery cell 22b which is connected in series to a third battery cell 22c, and so on. In FIG. 11A, as shown, an anode 60a-h of a first battery cell 22a has a tab that extends out to contact an intervening connector strip 130a-g which in turn extends over or below an adjacent cathode current collector 72b1-8 of the adjacent battery cell 22b. In the version shown in FIG. 11B, a first conductor 40a1 of a first battery cell 22a, such as an anode 60a1, is connected to a second conductor 40b2 of an adjacent second battery cell 22b, such as a cathode current collector 72b2 of the adjacent cell 22b. In each battery cell 22a,b, the first and second conductors 40a1,b1 or 40a2,b2 are different conductors that are on opposing surfaces of an electrolyte 84a,b that is between the conductors. For example, the first conductors 40a1,a2 can be an anode 60a1,a2, anode current collector, or a single conducting strip 130b,c that serves as both the anode 60a and anode current collector 72a. Conversely, the second conductors 40b1,b2 can be a cathode 60b1, b2, cathode current collector 72b1, b2, or a single conducting strip 130b,c that serves as both the cathode 60b and cathode current collector 72b. The conducting strip 130b,c is advantageous when it is desirable to minimize direct contact between the anode 60a or anode current collector 72a of one cell 22a, and the adjacent cathode 60b or cathode current collector 72b of another cell 22b, for example, when the anode and cathode materials would react with one another. The connector strip 130 serves as a chemical barrier or buffer strip between the two cells 22a,b.

Figure 11B:
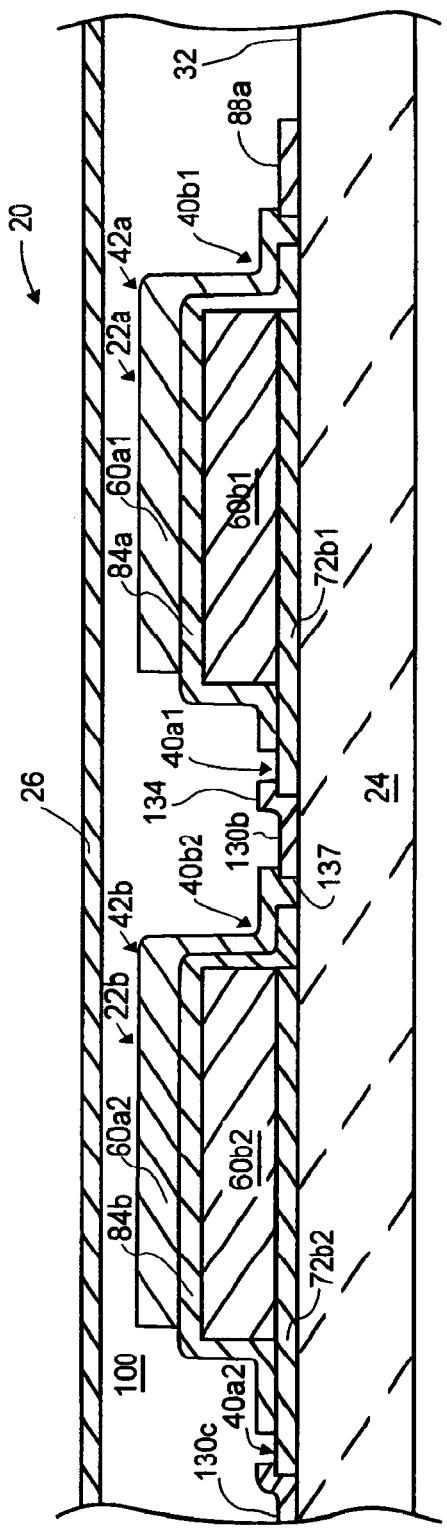
FIG. 11B is a schematic side sectional view of an arrangement of battery cells formed on one side of a substrate and also connected in series.

In one version, as shown in FIG. 11B, the electrical connector strip 130b comprises a head 134 that extends over a first conductor 40a1 of a battery cell 22a and a foot 137 that extends underneath a second conductor 40b2 of an adjacent battery cell 22b, or vice versa, to electrically couple the battery cells 22a,b to one another. For example, the first conductor 40a1 can be a cathode current collector 72b1 that is below another electrolyte 84a and extends out from under the electrolyte, and the second conductor 40b2 can be an anode 60a2 that overlays the electrolyte 84b. In this version, the battery cells 22a,b are arranged in a row with an anode 60a1 of a battery cell 22a abutting a cathode current collector 72b2 of an adjacent battery cell 22b, and so on. At least one of the conductors, such as the conductors 40b1,b2, has a non-contact surface 42a,b that does not contact the substrate 24 to allow expansion of the battery cells 22a,b in the direction of the non-contact surface 42a,b. A cap 26 is spaced apart from the non-contact surface 42a,b of the conductors 40b1,b2 by a gap 100 having a gap distance $d_{g1}$ of from about 1 μm to about 120 μm to complete the battery 20.

Referring back to FIG. 11A, the substrate surface 32 can also have more than one row, for example, a first row 136a of battery cells 22a-d and a second row 136b of battery cells 22e-h that are electrically connected to one another by an electrical connector strip 130d that is a U-shaped strip which connects adjacent battery cells 22d, 22e at first ends 138a,b of the first and second rows 136a,b, respectively. The battery cells 22a and 22h at the second ends 140a,b of the first and second rows 136a,b are terminated with a negative terminal 88a and a positive terminal 88b, respectively. The negative terminal 88a and positive terminal 88b allow electrical connection of the battery 20 to the external environment.

The thin film components of the battery 20, such as the conductors 40 and electrolyte 84 are deposited on the substrate 24, or onto layers already on the substrate 24, and can have a number of different configurations, for example, positions and shapes, and should not be limited to the exemplary configurations which are described herein to illustrate exemplary embodiments of the invention. These films are typically thin layers that have a thickness of from about 1 μm to about 100 μm; however, they may be thicker of even thinner depending on the desired current carrying capacity of the battery and its desired volume or weight. The thin film layers may be continuous, segmented or patterned. The thin films are typically be deposited by a PVD process, such as RF or DC magnetron sputtering of a target with a relatively high plasma density, for example, as described in U.S. Pat. No. 6,632,563 to Krasnov et al., issued Oct. 14, 2003, which is incorporated herein by reference in its entirety. The deposition chamber may be a vacuum chamber comprising one or more sputtering targets and a process gas distribution manifold for distributing process gases into the chamber.

For example, to deposit an electrode 60, such as a cathode 60b, comprising a material such as, for example, a crystalline LiCoO$_2$ film, a mixture of argon and oxygen gases is introduced into the chamber with a total pressure of 5 to 25 mTorr and a volumetric flow rate ratio of Ar/O$_2$ of from about 1 to about 45. The target comprises a disc of LiCoO$_x$. Radio frequency (RF) sputtering of the target can be performed at a power density level of 1 to 20 W/cm$^2$. The LiCoO$_2$ film can be deposited on the substrate 24 at relatively low temperatures, such as less than 100° C. Thereafter, the deposited cathode material is thermally annealed to a temperature of from about 150° C. to 600° C. in an annealing gas comprising ambient oxygen to reduce the defects in the as deposited cathode material.

In another example, to deposit a current collector 72a,b comprising a metal such as, for example, copper, the current collector 72a,b is formed by depositing the metal using a sputtering system similar to the one used for deposition of the cathode. However, the sputtering gas may be pure argon and DC instead of RF magnetron; sputtering may also be used to sputter a target. To deposit a film comprising copper material, the target material comprising copper and a gas comprising argon is introduced into the chamber at a pressure of about 1 to 10 mTorr. The gas may be energized with DC energy at a power level of from about 0.5 to about 5 kW, and more preferably about 1 kW. The temperature of the substrate 24 may be maintained at less than 100° C. This is performed for 240 seconds to deposit a film of copper having a thickness of about 0.3 microns on the substrate 24.

In another example, the deposition of an electrolyte 84 comprising, for example, amorphous lithium phosphorus oxynitride material may be carried out in a vacuum chamber similar to that used for deposition of the cathode and cathode current collector. For example, the lithium phosphorous oxynitride may be deposited by RF sputtering of a lithium phosphate (Li$_3$PO$_4$) target in pure nitrogen at a power density level of from about 1 to about 20 W/cm$^2$. The flow rate of nitrogen gas is from about 100 to about 1000 sccm, and the gas is maintained at a pressure of less than about 20 mTorr, and more preferably at least about 1 mTorr. The sample is then annealed in nitrogen or in air at 200° C. for 10 minutes to increase the ionic conductivity of electrolyte and to reduce the resistance of any interfaces.

The above examples of methods to deposit the comprising films are only exemplary embodiments of methods to form the battery 20. Other methods may be used to fabricate the battery 20. Furthermore, the materials of the components described in the exemplary manufacturing methods are only exemplary materials, and components of the battery 20 may comprise other materials as described herein. The scope of the battery 20 should not be limited by the exemplary methods of manufacture provided herein.

While illustrative embodiments of the battery 20 are described in the present application, it should be understood that other embodiments are also possible. For example, the battery 20 may have a plurality of battery cells 22 arranged horizontally or stacked in a convoluted or non-symmetrical shape depending on the application. Also, the packaging assembly of the present invention can be applied to contain and hermetically seal other type of batteries, as would be apparent to those of ordinary skill in the art. Thus, the scope of the claims should not be limited to the illustrative embodiments.

What is claimed is:

1. A battery comprising:
   (a) a substrate comprising an electrolyte between a pair of conductors, at least one conductor having a non-contact surface; and
   (b) a cap spaced apart from the conductor with the non-contact surface by a gap having a gap distance $d_g$ of from about 1 μm to about 120 μm, whereby the conductor can expand into the gap.

2. A battery according to claim 1 wherein the gap distance $d_g$ is less than about 10 μm.

3. A battery according to claim 1 wherein the gap is bounded at least partially by the non-contact surface of the conductor and a plurality of side faces, and wherein the ratio of the area of the non-contact conductor surface to the total area of the side faces is greater than about 10:1.

4. A battery according to claim 1 comprising a seal extending around the side faces of the gap.

5. A battery according to claim 4 wherein the seal comprises at least one of:

(1) a moisture permeability of less than about 1.75 g/(mil*100 inch$^2$)/day;
(2) is made from a conductive material; or
(3) is made from at least one of epoxy, polymerized ethylene acid copolymer, Apiezon®, paraffin, wax, Surlyn® and mixtures thereof.

6. A battery according to claim 1 further comprising a pliable dielectric within the gap.

7. A battery according to claim 6 wherein the pliable dielectric comprises at least one of:
(1) a material that does not react with the conductors;
(2) a material that can withstand a pressure of up to about 1 kg/mm$^2$ with a thickness deformation of less than about 0.1 mm;
(3) a moisture permeability of less than about 10 g/(mil*100 inch$^2$)/day; and
(4) is made from at least one of Apiezon®, paraffin, wax, mineral oil and mixtures thereof.

8. A battery according to claim 1 wherein at least one of the substrate or cap comprises a sheet of mica, quartz, metal foil, metalized plastic film, metal casing, ceramic casing or glass casing.

9. A battery according to claim 1 comprising a pair of electrical connectors extending though the gap to the external environment, each electrical connector being connected to at least one conductor.

10. A battery according to claim 1 comprising a housing enclosing the substrate and the cap.

11. A battery according to claim 10 wherein the housing comprises two pieces of metal foil about the substrate.

12. A battery according to claim 1 wherein the cap comprises a metal foil or metalized plastic film.

13. A battery according to claim 12 comprising a second cap about the substrate, the second cap comprising a metal foil or metalized plastic film.

14. A battery comprising:
(a) a first substrate comprising an electrolyte between a first pair of conductors, at least one of the conductors having a first non-contact surface;
(b) a second substrate comprising an electrolyte between a second pair of conductors, at least one of the conductors having a second non-contact surface; and
(c) a first gap about the first non-contact surface of the first pair of conductors and a second gap about the second non-contact surface of the second pair of conductors, the first and second gaps each comprising a gap distance $d_g$ of from about 1 μm to about 120 μm, whereby the first and second gaps allow the first and second conductors to expand.

15. A battery according to claim 14 wherein the gap distance $d_g$ is less than about 10 μm.

16. A battery according to claim 14 wherein the first non-contact surface faces the second non-contact surface and wherein the first and second gaps are both therebetween.

17. A battery according to claim 16 comprising a cap between the first and second gaps, the cap comprising a metal foil or metalized plastic film.

18. A battery according to claim 17 wherein the first and second gaps are each filled with a pliable dielectric.

19. A battery according to claim 14 wherein the first non-contact surface faces a second substrate to form the first gap therebetween, and wherein the second non-contact surface faces a cap to form a second gap therebetween.

20. A battery according to claim 14 wherein the first or second substrate comprises a sheet of mica, quartz, metal foil, metallized plastic film, metal casing, ceramic casing or glass casing.

21. A battery according to claim 14 wherein each of the first and second gaps is bounded at least partially by a non-contact surface of a conductor and a plurality of side faces, and wherein the ratio of the area of the non-contact conductor surface to the total area of the side faces is greater than about 10:1.

22. A battery according to claim 14 comprising a seal extending around the side faces of the gap.

23. A battery according to claim 14 comprising a pliable dielectric in at least one of the first and second gaps.

24. A battery according to claim 14 where the first and second substrates are connected in parallel with electrical connectors extending around the first and second substrates.

25. A battery according to claim 14 where the first and second substrates are connected in series with electrical connectors extending through holes in the first and second substrates.

26. A battery according to claim 14 comprising a pair of electrical connectors extending though the gap to the external environment, each electrical connector being connected to at least one of the first or second pairs of the conductors.

27. A battery according to claim 14 comprising a housing enclosing the first and second substrates.

28. A battery according to claim 27 wherein the housing comprises a pair of metal foils or metalized plastic films.

29. A battery according to claim 14 comprising a first cap about the first gap, and a second cap about the second gap, the first and second caps each comprising a metal foil or metalized plastic film.

30. A battery comprising:
(a) a substrate having (i) a first surface comprising a first battery cell comprising a first electrolyte between a first pair of conductors, at least one of the first pair of conductors having a first non-contact surface and (ii) a second surface comprising a second battery cell comprising a second electrolyte between a second pair of conductors, at least one of the second pair of conductors having a second non-contact surface;
(b) a first cap spaced apart from the first non-contact surface of a conductor by a first gap having a gap distance $d_{g1}$ of from about 1 μm to about 120 μm, whereby the conductor can expand into the first gap; and
(c) a second cap spaced apart from the second non-contact surface of a conductor by a second gap having a gap distance $d_{g2}$ of from about 1 μm to about 120 μm, whereby the conductor can expand into the second gap.

31. A battery according to claim 30 wherein the gap distance $d_g$ is less than about 10 μm.

32. A battery according to claim 30 further comprising a plurality of second substrates that each comprise a first surface with a first battery cell and a second surface with a second battery cell.

33. A battery according to claim 32 wherein at least one of the first and second caps is a substrate having a surface with a battery cell.

34. A battery according to claim 30 comprising a pair of caps about either surface of the substrate, each cap comprising a metal foil or metalized plastic film.

35. A battery according to claim 30 wherein the first and second gaps are each filled with a pliable dielectric.

36. A battery according to claim 35 wherein the first and second caps each comprise a metal foil or metalized plastic film.

* * * * *